June 26, 1962 M. S. CARMICHAEL, JR 3,041,112
DUMP CART
Filed Jan. 15, 1960 4 Sheets-Sheet 1

*INVENTOR.*
MEAD S. CARMICHAEL JR.

BY *Schmieding and Fultz*

ATTORNEYS

June 26, 1962　　M. S. CARMICHAEL, JR　　3,041,112
DUMP CART
Filed Jan. 15, 1960　　4 Sheets-Sheet 2
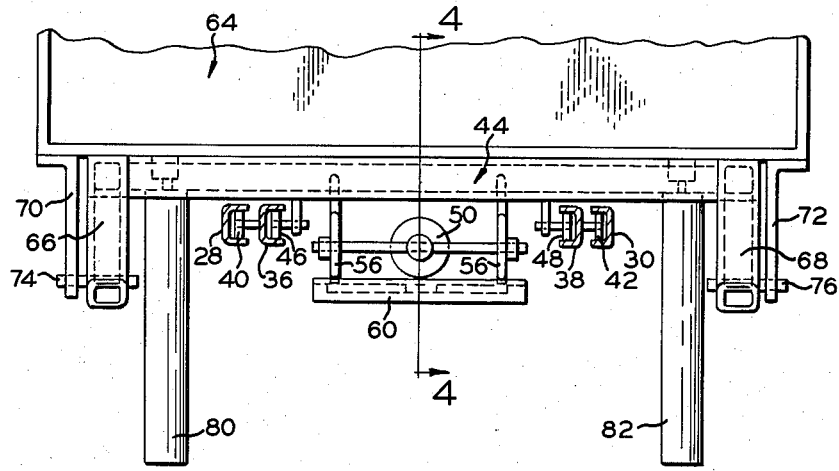
FIG. 3
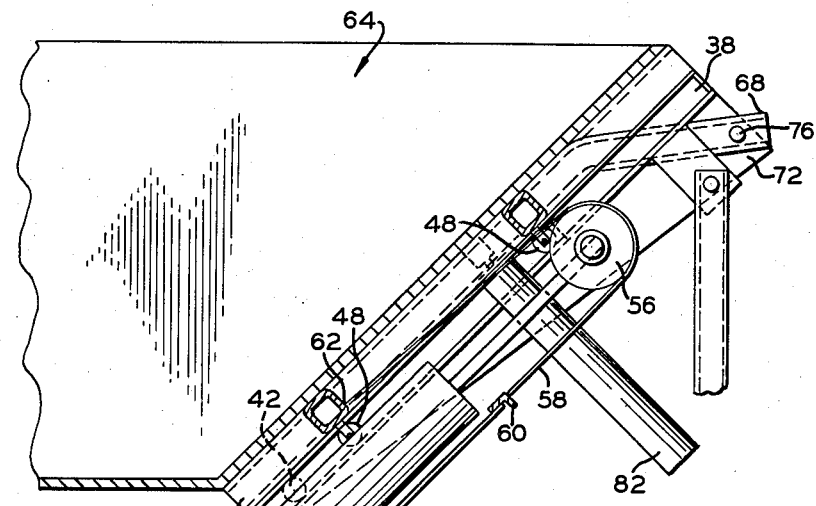
FIG. 4
INVENTOR.
MEAD S. CARMICHAEL JR
BY
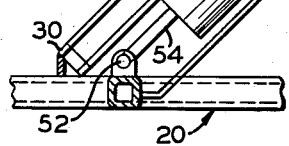
ATTORNEYS June 26, 1962 M. S. CARMICHAEL, JR 3,041,112
DUMP CART
Filed Jan. 15, 1960 4 Sheets-Sheet 4
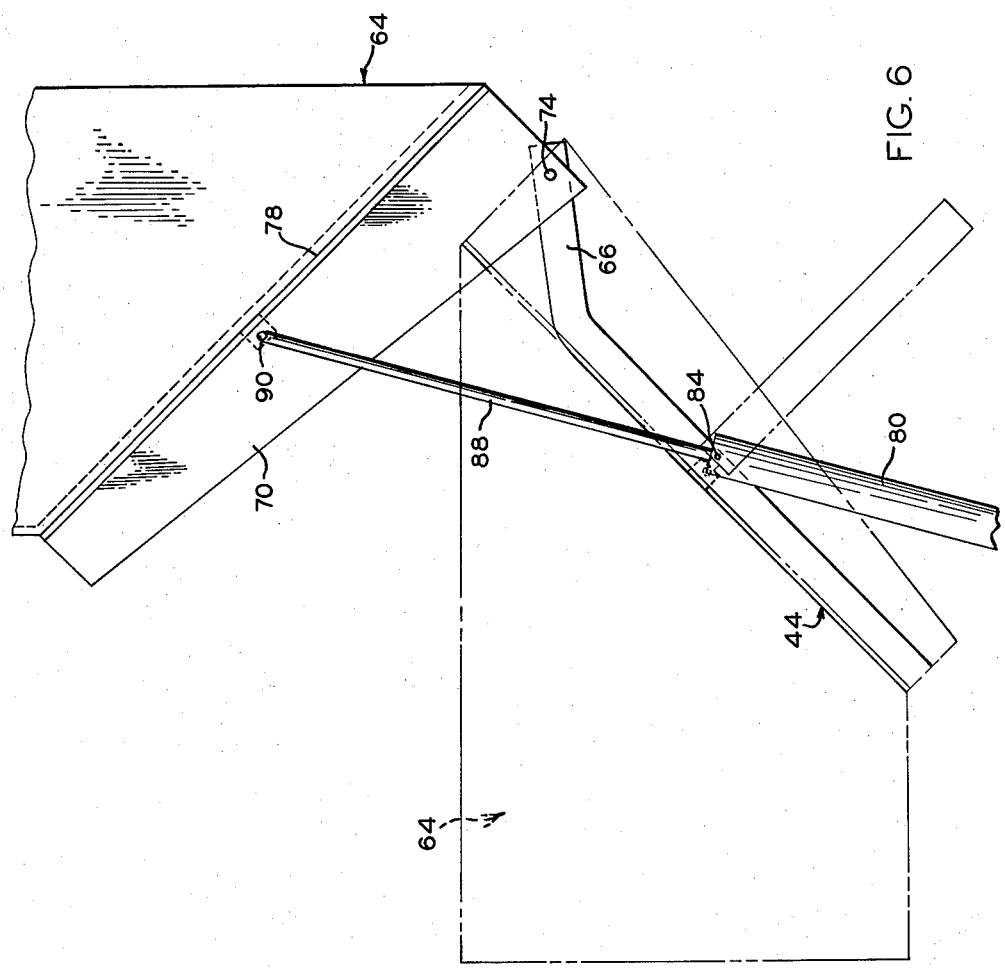
INVENTOR.
MEAD S. CARMICHAEL JR.
BY
Schmieding and Fultz
ATTORNEYS

United States Patent Office 3,041,112
Patented June 26, 1962

3,041,112
DUMP CART
Mead S. Carmichael, Jr., Columbus, Ohio, assignor to The Scott Viner Company, Columbus, Ohio, a corporation of Ohio
Filed Jan. 15, 1960, Ser. No. 2,708
8 Claims. (Cl. 298—11)

This invention relates to dump carts and particularly to a cart of the type that is towed behind a harvester for receiving the crop and for later loading the crop in a vehicle or storage bin.

In general, the cart of the present invention comprises a frame provided with supporting wheels and a drawbar for attachment to the rear of a viner or other harvester. The frame includes an upwardly and rearwardly extending track means that carries a hopper that can be moved along the track means from a lower crop receiving position to an upper dumping position.

In accordance with the present invention, the dump cart is provided with novel mechanism for moving the hopper along the track means for dumping the hopper after it has been moved to the previously mentioned dumping position.

It is therefore an object of the present invention to provide an improved dump cart adapted to be towed by a harvester which cart includes a hopper that can be moved from a lower crop receiving position to an elevated dumping position.

It is another object of the present invention to provide a cart of the type described that includes novel mechanism for elevating and dumping a hopper.

Further objects and advantages of the present invention will be apparent from the following description, reference being had to the accompanying drawings wherein a preferred form of embodiment of the invention is clearly shown.

In the drawings:

FIG. 3 is a partial rear view of a lift and dump mechanism comprising a portion of the cart of the preceding figures, the view being taken along the line 3—3 of FIG. 1;

FIG. 4 is a partial side sectional view of the lift and dump mechanism of FIG. 3, the section being taken along the line 4—4 of FIG. 2;

FIG. 6 is a partial side sectional view showing the hopper and dump mechanism in a dumping configuration.

Figure 1:
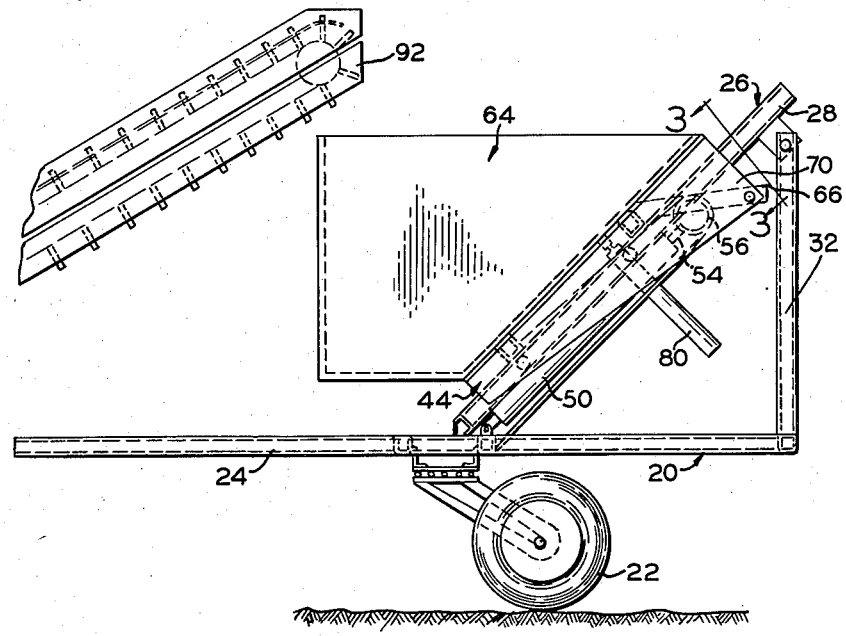
FIG. 1 is a side elevational view of a dump cart constructed according to the present invention.
Figure 2:
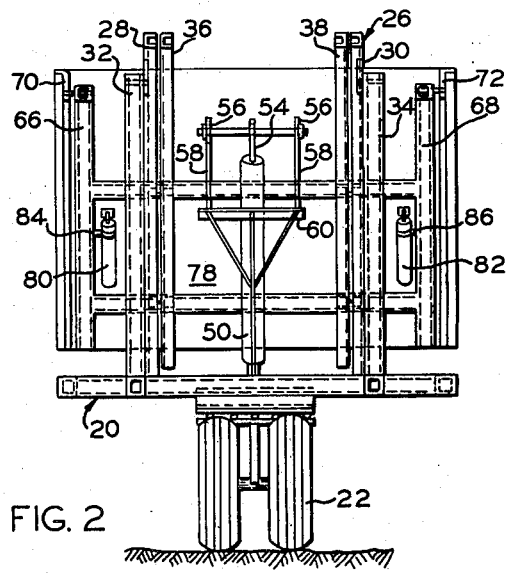
FIG. 2 is a rear elevational view of the dump cart of FIG. 1.

Referring in detail to the drawings, FIGS. 1 and 2 illustrate a cart constructed according to the present invention that comprises a frame indicated generally at 20 that includes wheels 22 and a drawbar 24.

The frame includes a rearwardly and upwardly inclined track means indicated generally at 26. Track means 26 includes a pair of outer U-shaped rails 28 and 30 the lower ends of which are mounted to frame 20 by studs and the upper ends of which are mounted to vertical frame members 32 and 34. Track means 26 further includes an extendable track portion in the form of a pair of inner U-shaped rails 36 and 38 which are extendably mounted relative to outer rails 28 and 30 by means of rollers 40 and 42, as is best seen in FIG. 3.

A hopper base indicated generally at 44 is extendably mounted on inner rails 36 and 38 by means of rollers 46 and 48.

A power cylinder 50 is mounted to frame 20 at a pivot 52 and includes a piston rod 54 which is extendable and retractable upon admission or release of fluid from the cylinder of power cylinder 50. Piston rod 54 carries a pulley 56 and a flexible cable 58 is connected to frame 20 at the member 60. Cable 58 extends around pulley 56 and is attached to the hopper base at a connection 62.

When power cylinder 50 is pressurized, the extension of piston rod 54 applies tension to cable 58 whereby hopper base 44 is moved upwardly. When hopper base 44 moves upwardly, inner rails 36 and 38 are extended relative to stationary outer rails 28 and 30, that is, they are moved from the configuration shown in FIGS. 1 and 2 to the configuration shown in FIG. 4.

Figure 5:
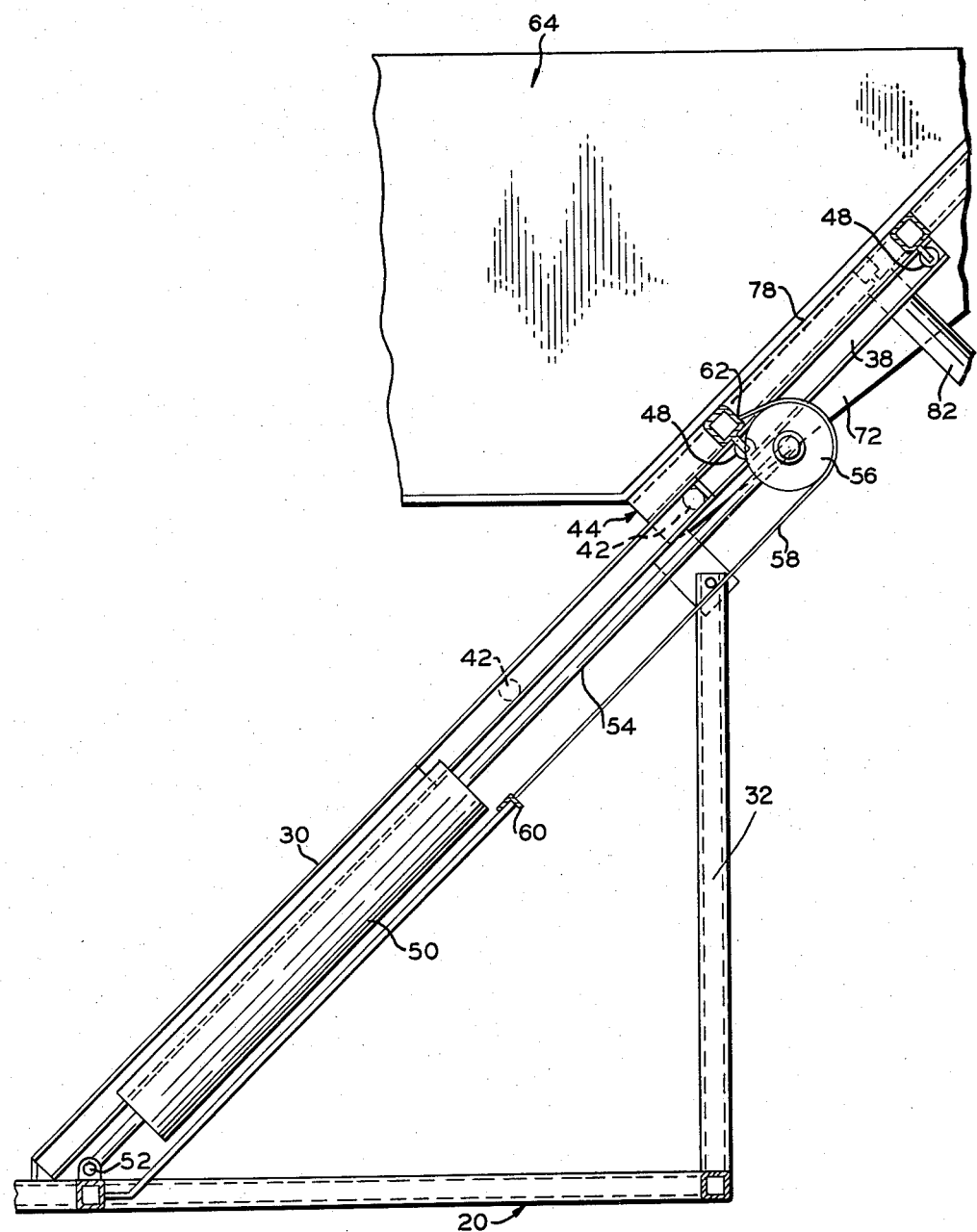
FIG. 5 is a second side sectional view showing the lift and dump mechanism of FIG. 4 when the lift mechanism is in an extended position.

Upon further extension of piston rod 54 by the power cylinder 50, hopper base 44 is extended relative to the previously extended inner rails 36 and 38 until a hopper 64 has been moved to the dump position illustrated in FIG. 5. Such further extension of hopper 64 causes movement of inner pulleys 46 and 48 along inner rails 36 and 38.

Hopper base 44 includes upwardly extending frame members 66 and 68 and hopper 64 includes side plates 70 and 72 that are pivotally attached to frame members 66 and 68 at the pivots 74 and 76.

It should be pointed out that an inclined rear wall 78 of hopper 64 normally rests on hopper base 44. The hopper is moved to the dumping configuration of FIG. 6 by pressurizing power cylinders 80 and 82 pivotally mounted to hopper base 44 at pivots 84 and 86. Upon pressurization of power cylinders 80 and 82, the piston rods 88 pivotally mounted to the bottom wall of the hopper at 90 are extended to rotate hopper 64, about pivots 74 and 76, whereby the hopper is moved from the level configuration of FIG. 5 to the dumping configuration of FIG. 6.

When the load has been dumped power cylinders 80 and 82 are depressurized whereby the weight of hopper 64 causes the hopper to move downwardly and come to rest on hopper base 44. Fluid is next released from the lifting power cylinder 50 whereby the weight of the hopper causes hopper base 44 to roll downwardly along inner rails 36 and 38 and such inner rails are retracted downwardly relative to outer stationary rails 28 and 30. The cart is then ready to receive the next load from a crop conveyor partially illustrated in FIG. 1 and indicated generally at 92.

While the form of embodiment of the present invention as herein disclosed constitutes a preferred form, it is to be understood that other forms might be adopted, all coming within the scope of the claims which follow.

I claim:

1. A dump cart comprising, in combination, a frame including an upwardly and rearwardly extending track means; wheels for the frame; a hopper base movably mounted on said track means; a hopper carried by said hopper base; means forming a pivotal connection between said hopper and said hopper base; a fluid actuated cylinder including a first end mounted to said frame and a second end; a pulley mounted on said second end of said fluid actuated cylinder; a flexible member connected between said frame and said hopper base, said flexible member being extended around said pulley whereby pressurization of said fluid actuated cylinder extends said pulley and flexible member and thereby moves said hopper base up said track means; and a second power means for pivoting said hopper about said pivotal connection.

2. A dump cart comprising, in combination, a frame including an upwardly and rearwardly extending track means; wheels for the frame; a hopper base movably mounted on said track means; a hopper carried by said hopper base; means forming a pivotal connection between said hopper and said hopper base; a fluid actuated cylinder including a first end mounted to said frame and a second end; a pulley mounted on said second end of said fluid actuated cylinder; a flexible member connected between said frame and said hopper base, said flexible member being extended around said pulley whereby pressurization of said fluid actuated cylinder extends said pulley and flexible member and thereby moves said hopper base up said track means; and a fluid actuated cylinder operatively connected between said hopper base and a location on said hopper spaced from said pivotal connection.

3. A dump cart comprising, in combination, a frame including an upwardly and rearwardly extending track means; wheels for said frame; a hopper base movably mounted on said track means, an upper end of said hopper base including a first pivot portion; a hopper including an upwardly and rearwardly extending rear wall overlying said hopper base, said hopper including a second pivot portion connected to said first pivot portion adjacent the rear upper edge of said hopper; a fluid actuated cylinder including a first end mounted to said frame and a second end; a pulley mounted on said second end of said fluid actuated cylinder; a flexible member connected between said frame and said hopper base, said flexible member being extended around said pulley whereby pressurization of said fluid actuated cylinder extends said pulley and flexible member and thereby moves said hopper base up said track means; and a second power means for pivoting said hopper about said pivotal connection.

4. A dump cart comprising, in combination, a frame including an upwardly and rearwardly extending track means; wheels for said frame; a hopper base movably mounted on said track means, an upper end of said hopper base including a first pivot portion; a hopper including an upwardly and rearwardly extending rear wall overlying said hopper base, said hopper including a second pivot portion connected to said first pivot portion adjacent the rear upper edge of said hopper; a fluid actuated cylinder including a first end mounted to said frame and a second end; a pulley mounted on said second end of said fluid actuated cylinder; a flexible member connected between said frame and said hopper base, said flexible member being extended around said pulley whereby pressurization of said fluid actuated cylinder extends said pulley and flexible member and thereby moves said hopper base up said track means; and a fluid actuated cylinder operatively connected between said hopper base and a location on said hopper spaced from said pivotal connection.

5. A dump cart comprising, in combination, a frame; inclined track means mounted on said frame and including a stationary portion and an extendable and retractable track portion; wheels mounted on the frame; a hopper base rollably mounted on said track portion; a hopper carried by said hopper base; means forming a pivotal connection between said hopper and said hopper base; power means for extending said track portion and said hopper base and means for pivoting said hopper about said pivotal connection.

6. A dump cart comprising, in combination, a frame; inclined track means mounted on said frame and including a stationary portion and an extendable and retractable track portion; wheels mounted on the frame; a hopper base rollably mounted on said track portion; a hopper carried by said hopper base; means forming a pivotal connection between said hopper and said hopper base; power means for extending said track portion and said hopper base; and a fluid actuated cylinder operatively connected between said hopper base and a location on said hopper spaced from said pivotal connection.

7. A dump cart comprising, in combination, a frame; inclined track means mounted on said frame and including a stationary portion and an extendable and retractable track portion; wheels mounted on said frame; a hopper base rollably mounted on said track portion, an upper end of said hopper base including a first pivotal portion; a hopper including an upwardly and rearwardly extending rear wall overlying said hopper base, said hopper including a second pivot portion connected to said first pivot portion adjacent the rear upper edge of said hopper; power means for extending said track portion and said hopper base; and means for pivoting said hopper about said pivotal connection.

8. A dump cart comprising, in combination, a frame; inclined track means mounted on said frame and including a stationary portion and an extendable and retractable track portion; wheels mounted on said frame; a hopper base rollably mounted on said track portion, an upper end of said hopper base including a first pivot portion; a hopper including an upwardly and rearwardly extending rear wall overlying said hopper base, said hopper including a second pivot portion connected to said first pivot portion adjacent the rear upper edge of said hopper; power means for extending said track portion and said hopper base; and a fluid actuated cylinder operatively connected between said hopper base and a location on said hopper spaced from said pivotal connection.

References Cited in the file of this patent
UNITED STATES PATENTS

| | | |
|---|---|---|
| 817,790 | Marshall | Apr. 17, 1906 |
| 2,234,599 | Johnston | Mar. 11, 1941 |
| 2,432,472 | Hastings | Dec. 9, 1947 |
| 2,655,276 | Brodeske | Oct. 13, 1953 |
| 2,812,210 | Osborn | Nov. 5, 1957 |